United States Patent
Goto

(10) Patent No.: US 10,454,951 B2
(45) Date of Patent: Oct. 22, 2019

(54) CELL CONTROL DEVICE THAT CONTROLS MANUFACTURING CELL IN RESPONSE TO COMMAND FROM PRODUCTION MANAGEMENT DEVICE

(71) Applicant: FANUC CORPORATION, Yamanashi (JP)

(72) Inventor: Kazuya Goto, Yamanashi (JP)

(73) Assignee: FANUC CORPORATION, Yamanshi (JP)

( * ) Notice: Subject to any disclaimer, the term of this patent is extended or adjusted under 35 U.S.C. 154(b) by 193 days.

(21) Appl. No.: 15/489,425

(22) Filed: Apr. 17, 2017

(65) Prior Publication Data

US 2017/0302687 A1    Oct. 19, 2017

(30) Foreign Application Priority Data

Apr. 18, 2016 (JP) ................. 2016-083026

(51) Int. Cl.
| | |
|---|---|
| *H04L 29/06* | (2006.01) |
| *H04L 12/26* | (2006.01) |
| *G05B 15/02* | (2006.01) |
| *H04L 29/08* | (2006.01) |

(52) U.S. Cl.
CPC .......... *H04L 63/1416* (2013.01); *G05B 15/02* (2013.01); *H04L 43/0876* (2013.01); *H04L 63/1425* (2013.01); *H04L 67/12* (2013.01)

(58) Field of Classification Search
CPC . H04L 63/1416; H04L 43/0876; H04L 67/12; H04L 63/1425; G05B 15/02
See application file for complete search history.

(56) References Cited

U.S. PATENT DOCUMENTS

| 7,865,954 B1* | 1/2011 | Phoha ................. H04L 63/1466 709/224 |
| 2003/0043740 A1* | 3/2003 | March ............... H04L 29/06027 370/229 |
| 2004/0114519 A1* | 6/2004 | MacIsaac ................ H04L 43/00 370/232 |
| 2005/0135266 A1* | 6/2005 | Horng .................... H04L 43/00 370/252 |

(Continued)

FOREIGN PATENT DOCUMENTS

| JP | H4-240060 A | 8/1992 |
| JP | 2009-238185 A | 10/2009 |

(Continued)

*Primary Examiner* — Darren B Schwartz
(74) *Attorney, Agent, or Firm* — Hauptman Ham, LLP

(57) ABSTRACT

A cell control device able to prevent unauthorized communication in which a third party makes an unauthorized access to the apparatus. The cell control device includes a communication section that communicates with a production management device or plural machines, a communication controller that executes communication by the communication section, and a communication determination section that monitors an actual communication traffic and compares the actual communication traffic with a planned communication traffic of a communication planned to be executed by the communication controller to determine whether the actual communication traffic is more than the planned communication traffic.

2 Claims, 5 Drawing Sheets

(56) References Cited

U.S. PATENT DOCUMENTS

| | | | |
|---|---|---|---|
| 2005/0249214 A1* | 11/2005 | Peng | H04L 63/1458 |
| | | | 709/224 |
| 2006/0036727 A1* | 2/2006 | Kurapati | H04L 63/1458 |
| | | | 709/224 |
| 2012/0304297 A1* | 11/2012 | Chung | H04L 63/1416 |
| | | | 726/23 |
| 2013/0340079 A1* | 12/2013 | Gottlieb | H04L 63/1416 |
| | | | 726/23 |
| 2014/0164609 A1* | 6/2014 | Kay | H04L 63/1416 |
| | | | 709/224 |
| 2015/0172306 A1* | 6/2015 | Kim | H04L 63/1425 |
| | | | 726/23 |
| 2016/0028753 A1* | 1/2016 | Di Pietro | H04L 63/1425 |
| | | | 726/23 |
| 2016/0080425 A1* | 3/2016 | Cianfrocca | H04L 63/0227 |
| | | | 726/1 |
| 2016/0344754 A1* | 11/2016 | Rayapeta | H04L 63/1416 |
| 2016/0381068 A1* | 12/2016 | Galula | H04L 63/123 |
| | | | 726/23 |
| 2019/0168006 A1* | 6/2019 | Yoder | A61N 1/37252 |

FOREIGN PATENT DOCUMENTS

| | | |
|---|---|---|
| JP | 2011-186910 A | 9/2011 |
| JP | 2013-16000 A | 1/2013 |
| JP | 2015-26129 A | 2/2015 |

* cited by examiner

CELL CONTROL DEVICE THAT CONTROLS MANUFACTURING CELL IN RESPONSE TO COMMAND FROM PRODUCTION MANAGEMENT DEVICE

RELATED APPLICATIONS

The present application claims priority to Japanese Patent Application No. 2016-083026 filed Apr. 18, 2016, the disclosure of which is hereby incorporated by reference herein in its entirety.

BACKGROUND OF THE INVENTION

1. Field of the Invention

The invention relates to a cell control device that controls a manufacturing cell in response to a command from a production management device.

2. Description of the Related Art

Conventionally, cell control devices are known that control a manufacturing cell including machines in response to a command from a production management device as a host computer (e.g., Japanese Unexamined Patent Publication (Kokai) No. 2011-186910).

In this technical field, there is a need for a technique for preventing unauthorized communication in which a third party makes an unauthorized access to a cell control device.

SUMMARY OF THE INVENTION

A cell control device, which is configured to control a manufacturing cell including a plurality of machines in accordance with a command from a production management device, comprises a communication section configured to communicate with the production management device or the plurality of machines; a communication controller configured to carry out the communication by the communication section; and a communication determination section configured to monitor an actual communication traffic in the communication section, compare the actual communication traffic with a planned communication traffic of the communication planned to be carried out by the communication controller, and determine whether the actual communication traffic is more than the planned communication traffic.

The communication determination section may compare the actual communication traffic with the planned communication traffic for each predetermined time period. When the actual communication traffic is detected in a time period in which the communication controller does not carry out the planned communication, the communication determination section may determine in real time that the actual communication traffic is more than the planned communication traffic.

The cell control device may further comprise a communication block section configured to block the communication by the communication section when the communication determination section determines that the actual communication traffic is more than the planned communication traffic.

BRIEF DESCRIPTION OF THE DRAWINGS

The above-mentioned or other objects, features, and advantages of the invention will be clarified by the description of the following embodiments with reference to the accompanying drawings, in which.

DETAILED DESCRIPTION

Figure 1:
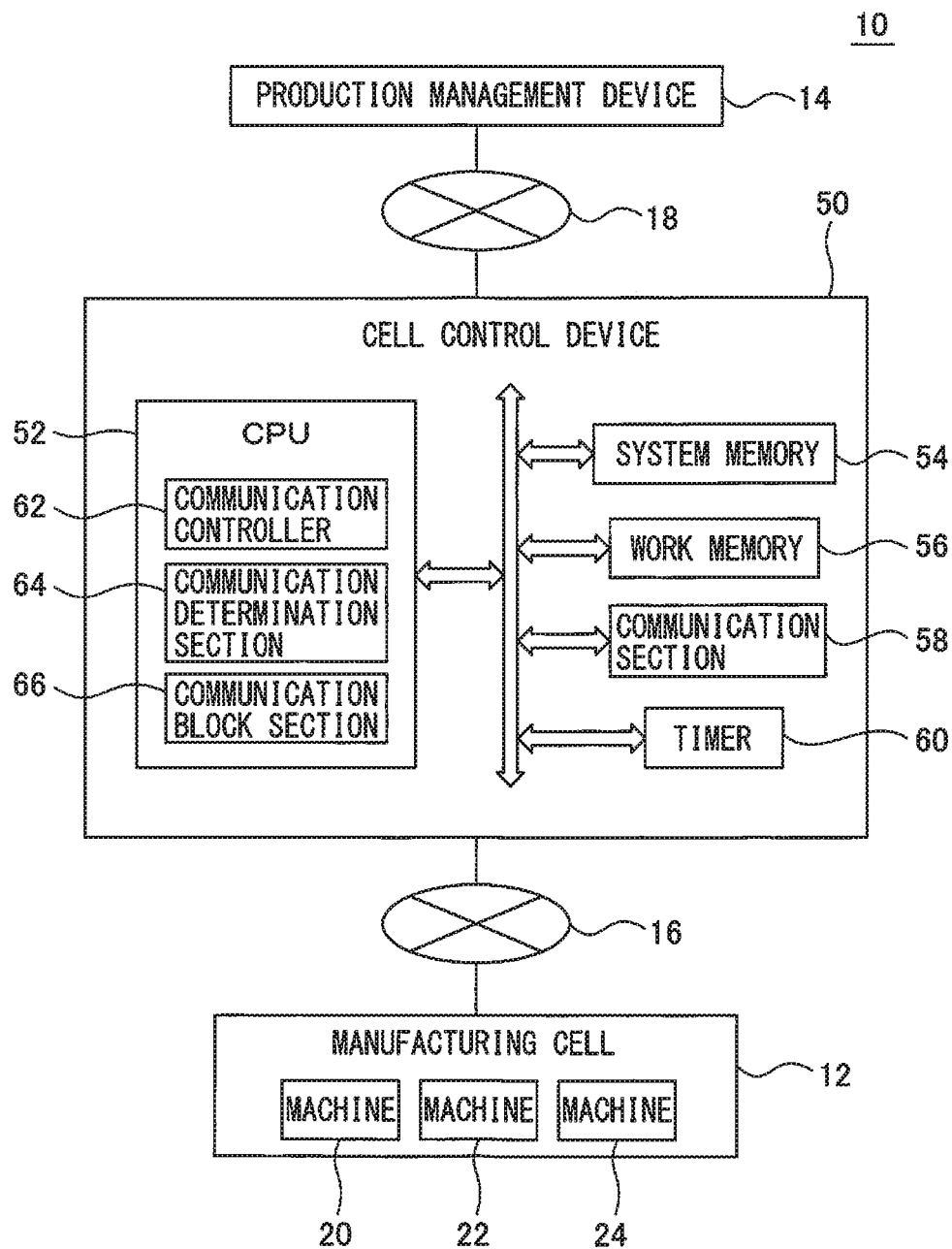
FIG. 1 is a block diagram of a network system according to an embodiment.

Hereinafter, embodiments of the invention will be described in detail with reference to the drawings. First, a network system 10 according to an embodiment of the invention will be described with reference to FIG. 1.

The network system 10 is an industrial system for manufacturing a product. The network system 10 includes a manufacturing cell 12, a cell control device 50, a production management device 14, and communication networks 16 and 18.

The manufacturing cell 12 includes a plurality of machines 20, 22, and 24. Each of the machines 20, 22, and 24 is e.g. an NC machine tool, an industrial robot, or a PLC. The machines 20, 22, and 24 sequentially carry out works for manufacturing a product in accordance with commands from the cell control device 50. As an example, the manufacturing cell 12 is installed in a first building on a factory premise for manufacturing the product.

The cell control device 50 transmits various commands to each of the machines 20, 22, and 24 via the communication network 16 in accordance with a command from the production management device 14 so as to control the operation of the manufacturing cell 12. As an example, the cell control device 50 is installed in a second building, which is different from the first building, on the factory premise for manufacturing the product. Details of the cell control device 50 will be described later.

The communication network 16 communicably connects the cell control device 50 and the machines 20, 22, and 24 of the manufacturing cell 12 to each other. As an example in which the manufacturing cell 12 is installed in the first building and the cell control device 50 is installed in the second building, the communication network 16 is comprised of an intranet or other LAN.

The production management device 14 includes e.g. a database, and manages the work flow in the manufacturing cell 12 or the material used for the product. The production management device 14 transmits various commands to the cell control device 50 via the communication network 18. As an example, the production management device 14 is installed in a third building outside of the factory premise for manufacturing the product.

The communication network 18 communicably connects the production management device 14 and the cell control device 50 to each other. As an example in which the cell control device 50 is installed in the second building and the production management device 14 is installed in the third building, the communication network 18 is comprised of Internet or the like.

The cell control device 50 includes a CPU 52, a system memory 54, a work memory 56, a communication section 58, and a timer 60. The CPU 52 performs various computing in order to carry out various processes to be executed in the cell control device 50.

The system memory 54 is an electrically erasable and recordable nonvolatile memory, and is comprised of e.g. an EEPROM (registered trademark) or the like. The system memory 54 records constants, variables, setting values, programs, or the like, which is necessary for the operation of the cell control device 50, so as not to be lost when the cell control device 50 is out of operation.

The work memory 56 is a high-speed readable and writable RAM, and is comprised of e.g. a DRAM, a SRAM, or the like. The work memory 56 has a memory capacity enough for the CPU 52 to execute various computing.

The communication section 58 includes e.g. an I/O interface, such as a USB port, an Ethernet (registered trademark) port or the like, and a communication control module (both unillustrated) configured to control communication via the I/O interface. The communication section 58 communicates with the manufacturing cell 12 and the production management device 14 in accordance with a command from the CPU 52.

The timer 60 clocks an elapsed time from a predetermined time point in accordance with a command from the CPU 52.

Figure 2:
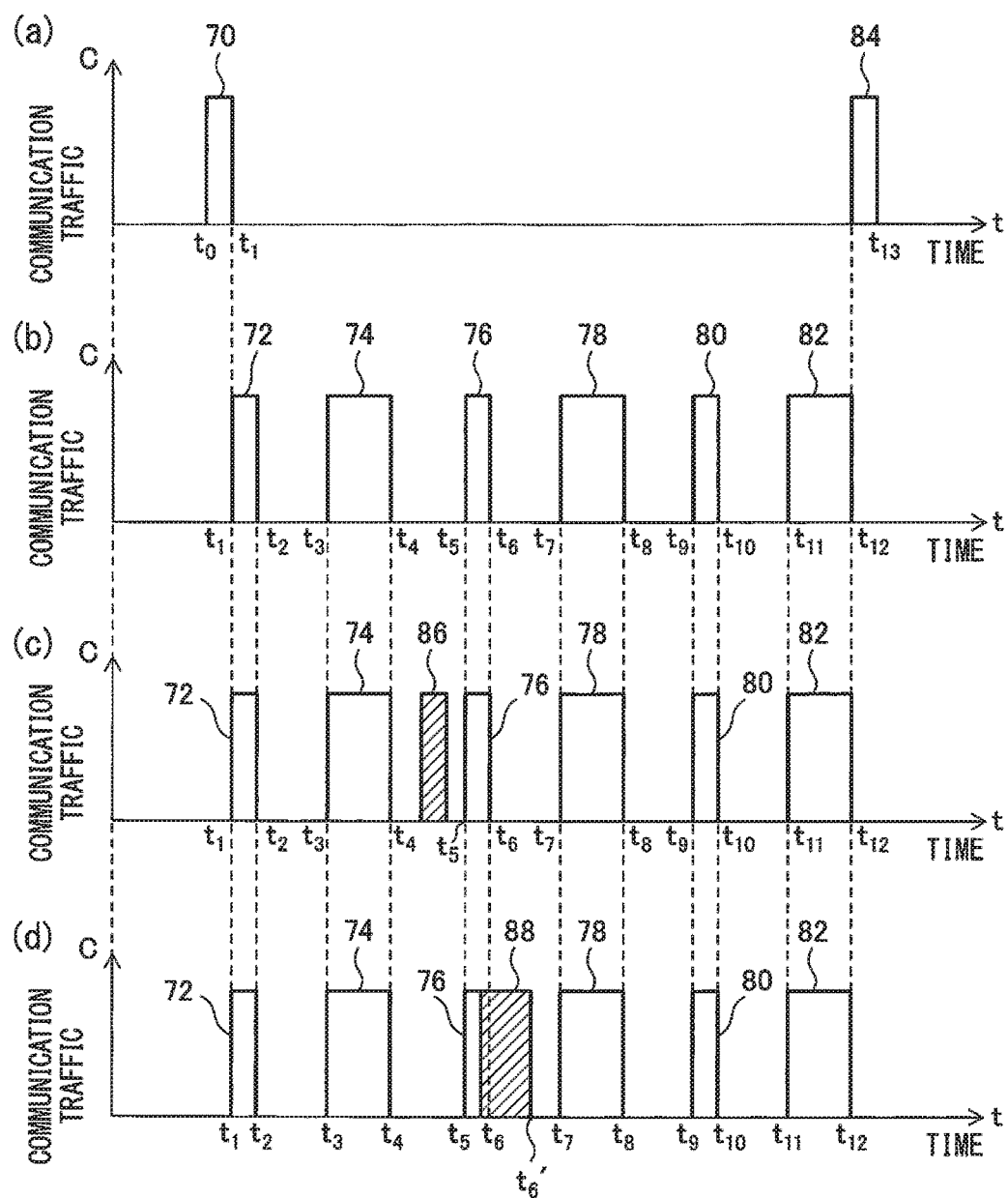
FIG. 2 is a timing diagram of the communication traffic in the network system shown in FIG. 1, wherein section (a) shows a timing diagram of the planned communication traffic between the production management device and the cell control device, section (b) shows a timing diagram of the planned communication traffic between the cell control device and the manufacturing cell, and sections (c) and (d) respectively shows timing diagrams of communication traffic when unauthorized communication is superimposed on the planned communication between the cell control device and the manufacturing cell.

Next, the operation of the network system 10 will be described with reference to FIG. 2. Section (a) in FIG. 2 shows a timing diagram of communication traffic C between the production management device 14 and the cell control device 50. Section (b) in FIG. 2 shows a timing diagram of communication traffic C between the cell control device 50 and the manufacturing cell 12 (i.e. the machines 20, 22, and 24).

As shown in section (a), the production management device 14 transmits a production command signal 70 to the cell control device 50 over a time period from time point $t_0$ to time point $t_1$. For example, the production command signal 70 includes a command for "manufacturing 'n' pieces of product A" in the manufacturing cell 12. The production command signal 70 is timely transmitted from the production management device 14 in accordance with a production plan stored in the production management device 14.

The production command signal 70 transmitted from the production management device 14 is transmitted to the communication section 58 of the cell control device 50 via the communication network 18.

The maximum communication speed of the communication network 18 is predetermined according to the structure of the communication network 18. In the example shown in FIG. 2, the signal is transmitted at the maximum communication speed of the communication network 18. In other words, when the production command signal 70 is transmitted at the maximum communication speed of the communication network 18, it take the time period from time point $t_0$ to time point $t_1$ to transmit the production command signal 70.

The CPU 52 of the cell control device 50 sends a command to the communication section 58 so as to cause the communication section 58 to receive the production command signal 70 transmitted from the production management device 14. Thus, in this embodiment, the CPU 52 functions as a communication controller 62 (FIG. 1) configured to cause the communication section 58 to carry out the communication. The CPU 52 stores the production command signal 70 received by the communication section 58 in the system memory 54.

When receiving the production command signal 70, the CPU 52 of the cell control device 50 sends a command to the communication section 58 so as to cause the communication section 58 to transmit a work command signal 72 to the machine 20. The work command signal 72 includes a command for causing the machine 20 to carry out a given work on the basis of the production command signal 70 (e.g., the command for "manufacturing 'n' pieces of product A").

In the example shown in section (b) in FIG. 2, the communication section 58 transmits the work command signal 72 to the machine 20 at a maximum communication speed of the communication network 16 over a time period from the time point $t_1$ to a time point $t_2$.

When receiving the work command signal 72, the machine 20 carries out the given work (e.g., processing, welding, and assembly of a workpiece) in accordance with the work command signal 72. When completing the given work, the machine 20 transmits a completion-report signal 74 to the communication section 58 of the cell control device 50. In the example shown in section (b) in FIG. 2, the completion-report signal 74 is transmitted over a time period from a time point $t_3$ to a time point $t_4$.

The CPU 52 of the cell control device 50 sends a command to the communication section 58 so as to receive the completion-report signal 74 transmitted from the machine 20, and stores the received completion-report signal 74 in the system memory 54.

When receiving the completion-report signal 74, the CPU 52 of the cell control device 50 sends a command to the communication section 58 so as to cause the communication section 58 to transmit a work command signal 76 to the machine 22. The work command signal 76 includes a command for causing the machine 22 to carry out a given work on the basis of the production command signal 70. In the example shown in section (b) in FIG. 2, the work command signal 76 is transmitted over a time period from a time point $t_5$ to a time point $t_6$.

When receiving the work command signal 76, the machine 22 carries out the given work in accordance with the work command signal 76. When completing the given work, the machine 22 transmits a completion-report signal 78 to the communication section 58 of the cell control device 50. In the example shown in section (b) in FIG. 2, the completion-report signal 78 is transmitted over a time period from a time point $t_7$ to a time point $t_8$.

The CPU 52 of the cell control device 50 sends a command to the communication section 58 so as to receive the completion-report signal 78 transmitted from the machine 22, and stores the received completion-report signal 78 in the system memory 54.

When receiving the completion-report signal 78, the CPU 52 of the cell control device 50 sends a command to the communication section 58 so as to cause the communication section 58 to transmit a work command signal 80 to the machine 24. The work command signal 80 includes a command for causing the machine 24 to carry out a given work on the basis of the production command signal 70. In the example shown in section (b) in FIG. 2, the work command signal 80 is transmitted over a time period from a time point $t_9$ to a time point $t_{10}$.

When receiving the work command signal 80, the machine 24 carries out the given work in accordance with the work command signal 80. When completing the given work, the machine 24 transmits a completion-report signal 82 to the communication section 58 of the cell control device 50. In the example shown in section (b) in FIG. 2, the completion-report signal 82 is transmitted over a time period from a time point $t_{11}$ to a time point $t_{12}$.

The CPU 52 of the cell control device 50 sends a command to the communication section 58 so as to receive the completion-report signal 82 transmitted from the machine 24, and stores the received completion-report signal 82 in the system memory 54.

When receiving the completion-report signal 82, the CPU 52 of the cell control device 50 sends a command to the communication section 58 so as to cause the communication section 58 to transmit a production-completion signal 84 to the production management device 14 over a time period from the time point $t_{12}$ to a time point $t_{13}$.

The production-completion signal 84 is a signal indicating that the command (e.g., "manufacturing 'n' pieces of product A") included in the production command signal 70 has been completed. In this way, the machines 20, 22, and 24 sequentially carry out the given works in accordance with the production command signal 70, and thereby, the products are manufactured.

The timing diagrams shown in sections (a) and (b) in FIG. 2 are of the communication planned to be carried out by the CPU 52 (hereinafter, referred to as "planned communication"). The flow of the planned communication is prescribed in a program previously constructed by a user, for example.

The CPU 52 carries out the planned communication shown in sections (a) and (b) in FIG. 2 in accordance with the program. The program, the above-mentioned work command signals 72, 76, and 80, and the production-completion signal 84 are pre-stored in the system memory 54.

There may be a risk that a third party makes an unauthorized access to the cell control device 50, different from the planned communication shown in sections (a) and (b) in FIG. 2.

In order to address this, the cell control device 50 according to this embodiment monitors the actual communication traffic $C_a$ in the communication section 58, compares the actual communication traffic $C_a$ with the planned communication traffic $C_p$ of the planned communication shown in sections (a) and (b) in FIG. 2, and determines whether the actual communication traffic $C_a$ is more than the planned communication traffic $C_p$, thereby detects unauthorized communication by a third party.

Below, this function will be described with reference to section (c) in FIG. 2. In the example shown in section (c), unauthorized communication 86 accessed to the communication section 58 via the communication network 16 is occurred in the time period from the time points $t_4$ to $t_5$. The CPU 52 constantly monitors the actual communication traffic $C_a$ of the communication that the CPU 52 commands the communication section 58 to carry out.

As an example, the cell control device 50 determines in real time whether any communication traffic is detected in the communication section 58 within a time period in which the CPU 52 does not carry out any planned communication. For example, in the example shown in section (c) in FIG. 2, the time period in which the planned communication is not to be carried out is each of the time periods from $t_2$ to $t_3$, from $t_4$ to $t_5$, from $t_6$ to $t_7$, from $t_8$ to $t_9$, and from $t_{10}$ to $t_{11}$.

The CPU 52 sends a command to the timer 60 at a time point $t_n$ (i.e., the time point $t_2$, $t_4$, $t_6$, $t_8$, $t_{10}$, or $t_{12}$) at which one planned communication $P_n$ (i.e. communication of the signal 72, 74, 76, 78, 80, or 82) has been completed, so as to clock an elapsed time from the time point $t_n$.

In this regard, it is possible to predict a time period $T_A$ from the time point $t_n$ when one planned communication $P_n$ is completed to a time point $t_{n+1}$ when next planned communication $P_{n+1}$ to be executed next to the one planned communication $P_n$ is started (i.e., $T_A=t_{n+1}-t_n$). Specifically, cycle times of works carried out by the machines 20, 22, and 24 are predictable. Accordingly, it is also possible to predict a time period from a time point when the CPU 52 completes the transmission of each of the work command signals 72, 76, and 80 to a time point when each of the completion-report signals 74, 78, and 82 is returned.

When the communication traffic C in the communication section 58 is detected in real time until the elapsed time from the time point $t_n$ clocked by the timer 60 reaches a predetermined time $\tau_1$, the CPU 52 determines in real time that the actual communication traffic $C_a$ in the communication section 58 is more than the planned communication traffic $C_p$.

The predetermined time $\tau_1$ is previously determined as a time which coincides with the predicted time period $T_A$ (i.e. $\tau_1=T_A$), and is stored in the system memory 54. When carrying out a process for detecting unauthorized communication, the CPU 52 reads out the time $\tau_1$ stored in the system memory 54, and stores the time $\tau_1$ in the work memory 56 so as to refer to it.

In the case of the example shown in section (c) in FIG. 2, the CPU 52 determines in real time whether the communication traffic C is detected in the communication section 58 until the time $\tau_1$ (e.g., corresponding to the time period from the time point $t_4$ to the time point $t_5$) is elapsed from each of the time points $t_2$, $t_4$, $t_6$, $t_8$, $t_{10}$, and $t_{12}$.

Thereby, the CPU 52 detects that communication traffic occurs in the communication section 58 in the time period from the time point $t_4$ to the time point $t_5$ in which no communication is planned, and thus, determines in real time that the actual communication traffic $C_a$ in the communication section 58 is more than the planned communication traffic $C_p$. As a result, the CPU 52 can detect the unauthorized communication 86 occurred in the time period from the time point $t_4$ to the time point $t_5$ in real time.

Thus, in this embodiment, the CPU 52 functions as a communication determination section 64 (FIG. 1) configured to determine whether the actual communication traffic $C_a$ is more than the planned communication traffic $C_p$.

When the CPU 52 detects the unauthorized communication 86 via the communication network 16, the CPU 52 sends a command to the communication section 58 so as to block communication between the communication section 58 and the communication network 16 via which the unauthorized communication has been made. Due to this, it is possible to prevent the third party from making an unauthorized access to the cell control device 50 via the communication network 16.

Thus, in this embodiment, the CPU 52 functions as a communication block section 66 (FIG. 1) configured to block the communication by the communication section 58.

On the other hand, the CPU 52 does not block the communication between the communication section 58 and the communication network 18 in which the unauthorized communication 86 is not detected. According to this configuration, since the communication via the communication network 18 in which the unauthorized communication 86 is not detected is continued, it is possible to continuously carry out at least a part of the functions of the cell control device 50 even if the unauthorized communication 86 is detected.

As another example, the CPU 52 may send a command to the timer 60 at a time point $t_{n-1}$ (i.e., a time point $t_1$, $t_3$, $t_5$, $t_7$, $t_9$, or $t_{11}$) at the start of one planned communication $P_n$ (i.e., the signal 72, 74, 76, 78, 80, or 82) so as to clock an elapsed time from the time point $t_{n-1}$.

This example will be described with reference to section (d) in FIG. 2. In the example shown in section (d) in FIG. 2, unauthorized communication 88 due to an unauthorized access to the communication section 58 via the communication network 16 is carried out so as to be partially superimposed on the planned communication of the work command signal 76. As a result, the planned communication of the work command signal 76 started at the time point $t_5$ is extended to a time point $t_6'$ ($>t_6$) by the unauthorized communication 88 being superimposed thereon.

In this example, the CPU 52 determines in real time whether any communication traffic is detected in the communication section 58 within a time period from a time when the elapsed time from the time point $t_{n-1}$ at the start of one planned communication $P_n$ passes a predetermined time $\tau_2$ to a time when this elapsed time reaches a time $\tau_3$.

In this regard, it is possible to predict a time period $T_B$ from the time point $t_{n-1}$ at the start of one planned communication $P_n$ to the time point $t_{n+1}$ at the start of next planned communication $P_{n+1}$ to be executed next to the one planned communication $P_n$ (i.e., $T_B = t_{n+1} - t_{n-1}$). Specifically, the cycle times of works carried out by the machines 20, 22, and 24 are predictable, as described above.

In addition, it is also possible to predict a time necessary for the communication of the signal 72, 74, 76, 78, 80, or 82 from an information amount (total communication traffic) of each of these signals, which is determined depending on a data format thereof etc., and the communication speed of the communication network 16. From such information, the time period $T_B$ is predictable.

The above-mentioned predetermined time $\tau_2$ is previously determined as a time coinciding with a time predicted to be necessary for the communication of the signal 72, 74, 76, 78, 80, or 82 (e.g., $\tau_2 = t_2 - t_1$), and is stored in the system memory 54.

Further, the above-mentioned predetermined time τ3 is previously determined as a time coinciding with the predicted time period $T_B$ (i.e. $\tau_3 = T_B$), and is stored in the system memory 54. When carrying out a process for detecting unauthorized communication, the CPU 52 reads out the times $\tau_2$ and $\tau_3$ stored in the system memory 54, and stores the times $\tau_2$ and $\tau_3$ in the work memory 56 so as to refer to them.

In the case of the example shown in section (d) in FIG. 2, the CPU 52 starts to clock the elapsed time by the timer 60 at each of the time points $t_1$, $t_3$, $t_5$, $t_7$, $t_9$, and $t_{11}$, and determines in real time whether any actual communication traffic is detected in the communication section 58 within a time period in which the elapsed time falls within the time period from the time $\tau_2$ to the time $\tau_3$ (e.g., corresponding to the time period from the time point $t_6$ to the time point $t_7$).

Thereby, the CPU 52 detects that the communication traffic occurs in the communication section 58 in the time period from the time point $t_6$ to the time point $t_7$, in which no communication is planned, and thus, determines in real time that the actual communication traffic $C_a$ in the communication section 58 is more than the planned communication traffic $C_p$. As a result, it is possible to detect the unauthorized communication 88 in the time period from $t_6$ to $t_7$.

When detecting the unauthorized communication 88, the CPU 52 functions as the communication block section 66 so as to block the communication between the communication section 58 and the communication network 16 via which the unauthorized communication 88 has been made.

Note that, the unauthorized communication 88 shown in section (d) in FIG. 2 may be started prior to the time point $t_5$ so as to be superimposed on the work command signal 76. Even in such a case, the CPU 52 can detect the unauthorized communication 88 by the method according to this example.

A communication for confirming a work progress status may be carried out as a planned communication between the cell control device 50 and the machines 20, 22, and 24 within a time period from a time when the work command signal 72, 76, 80 shown in section (b) in FIG. 2 is send to a time when the completion-report signal 74, 78, 82 is received.

Figure 3:
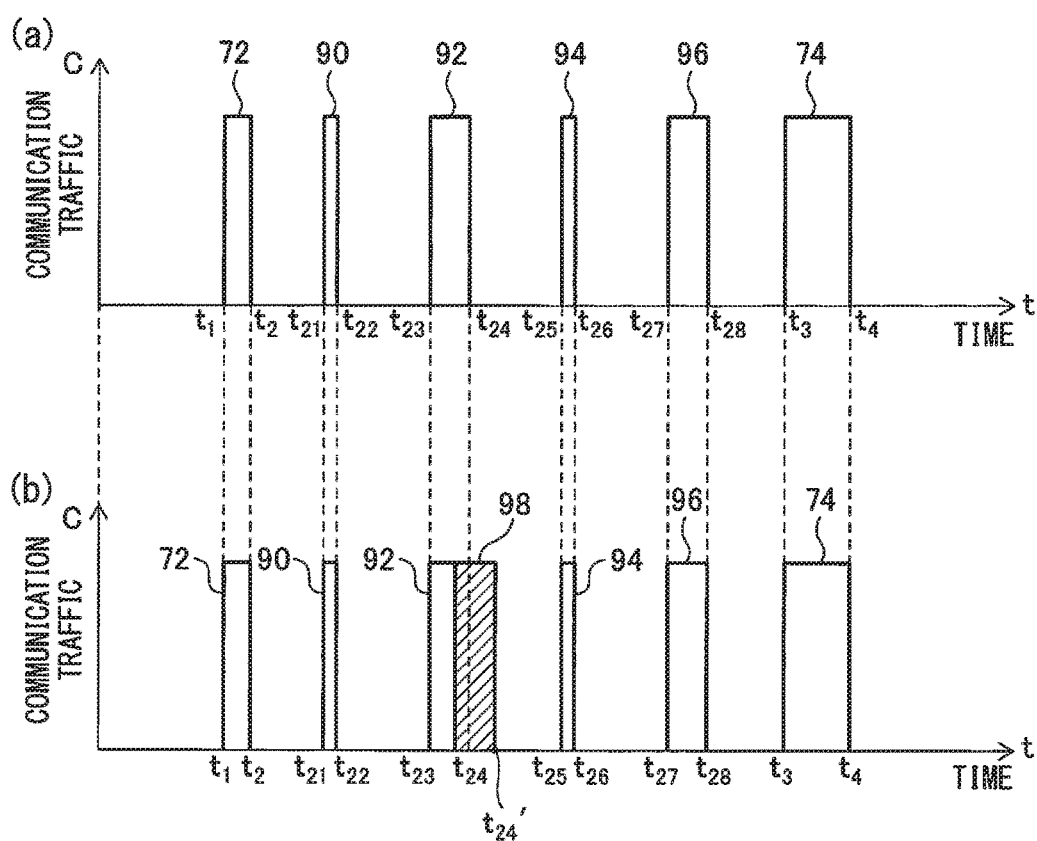
FIG. 3 is timing diagram of the communication traffic between the cell control device and the manufacturing cell according to another example, wherein section (a) shows a timing diagram of the planned communication traffic, and section (b) shows a timing diagram of the communication traffic when unauthorized communication is superimposed on a planned communication.

Such an example will be described below with reference to FIG. 3. FIG. 3 shows a time period between the work command signal 72 and the completion-report signal 74 as an example.

As shown in section (a) in FIG. 3, after transmitting the work command signal 72, the CPU 52 sends a command to the communication section 58 at a time point $t_{21}$ so as to cause the communication section 58 to transmit a first progress-confirmation signal 90 to the machine 20. In the example shown in section (a) in FIG. 3, the communication section 58 transmits the first progress signal 90 to the machine 20 over a time period from the time point $t_{21}$ to a time point $t_{22}$.

When the machine 20 receives the first progress-confirmation signal 90, it transmits a first progress-report signal 92, which indicates a progress status of a work currently being carried out by the machine 20, to the communication section 58 of the cell control device 50. In the example shown in section (a) in FIG. 3, the first progress-report signal 92 is transmitted over a time period from a time point $t_{23}$ to a time point $t_{24}$.

The CPU 52 causes the communication section 58 to receive the first progress-report signal 92 transmitted from the machine 20, and stores the received first progress-report signal 92 in the system memory 54.

After receipt of the first progress-report signal 92, the CPU 52 sends a command to the communication section 58 to cause the communication section 58 to transmit a second progress-confirmation signal 94 to the machine 20 over a time period from a time point $t_{25}$ to a time point $t_{26}$.

When the machine 20 receives the second progress-confirmation signal 94, it transmits a second progress-report signal 96, which indicates the progress status of the work currently being carried out by the machine 20, to the communication section 58 of the cell control device 50 over a time period from a time point $t_{27}$ to a time point $t_{28}$.

The CPU 52 of the cell control device 50 causes the communication section 58 to receive the second progress-report signal 96 transmitted from the machine 20, and stores the received second progress-report signal 96 in the system memory 54. The CPU 52 can understand the progress status of the work by the machine 20 from the acquired first and second progress-report signals 92 and 96.

The planned communication of the first progress-confirmation signal 90, the first progress-report signal 92, the second progress-confirmation signal 94, and the second progress-report signal 96 described above can be similarly executed within a time period between the work command signal 76 and the completion-report signal 78, and a time period between the work command signal 80 and the completion-report signal 82.

Thus, in this example, the CPU 52 carries out the planned communication for confirming the progress status of the work (i.e., the communication of the signals 90, 92, 94, and 96) in the time period from the transmission of the work command signal 72, 76, 80 to receipt of the completion-report signal 74, 78, 80. The flow of this planned communication is prescribed in a program previously constructed by a user, for example.

Next, with reference to section (b) in FIG. 3, the function for detecting unauthorized communication while carrying out the planned communication shown in section (a) in FIG. 3 will be described.

In the example shown in section (b) in FIG. 3, unauthorized communication 98 due to an unauthorized access to the communication section 58 via the communication network 16 is carried out so as to be partially superimposed on the planned communication of the first progress-report signal 92. As a result, the planned communication of the first progress-report signal 92 started at the time point $t_{23}$ is extended to a time point $t_{24}'$ ($>t_{24}$) by the unauthorized communication 98 being superimposed thereon.

The CPU 52 can similarly detect the unauthorized communication 98 by the method for detecting the unauthorized communication 88 of section (d) in FIG. 2 described above. Specifically, the CPU 52 determines in real time whether any communication traffic is detected in the communication section 58 within a time period from a time when the elapsed time from a time point $t_m$ at the start of one planned communication $P_m$ (i.e. planned communication of the signal 72, 90, 92, 94, or 96) passes a predetermined time $\tau_4$ to a time when this elapsed time reaches a time $\tau_5$.

In this regard, it is possible to predict a time period $T_c$ from the time point $t_m$ at the start of one planned communication $P_m$ to a time point $t_{m+1}$ at the start of next planned communication $P_{m+1}$ to be executed next to the one planned communication $P_m$ (i.e., $T_c=t_{m+1}-t_m$). Further, a time necessary for the communication of the signal 72, 90, 92, 94, or 96 can be also predicted.

The above-mentioned predetermined time $\tau_4$ is previously determined as a time coinciding with the time predicted to be necessary for the communication of the signal 72, 90, 92, 94, or 96 (e.g., $\tau_4$ corresponds to $t_{24}-t_{23}$), and is stored in the system memory 54. Further, the predetermined time $\tau_5$ is previously determined as a time coinciding with the predicted time period Tc (i.e., $\tau_5=T_c$), and is stored in the system memory 54.

The CPU 52 starts to clock the elapsed time by the timer 60 at each of the time points $t_1, t_{21}, t_{23}, t_{25}$, and $t_{27}$ at the start of the planned communication of the signals 72, 90, 92, 94, and 96. Then, the CPU 52 determines whether any communication traffic is detected in the communication section 58 within a time period in which the elapsed time clocked by the timer 60 is in a range of $\tau_4$-$\tau_5$ (e.g., corresponding to the time period from the time point $t_{24}$ to the time point $t_{25}$).

Thereby, the CPU 52 detects that communication traffic occurs in the communication section 58 within the time period from the time point $t_{24}$ to the time point $t_{25}$ in which no communication is planned, and thus, determines in real time that the actual communication traffic $C_a$ in the communication section 58 is more than the planned communication traffic $C_p$. As a result, the CPU 52 can detect the unauthorized communication 98 in the time period from $t_{24}$ to $t_{25}$.

When the unauthorized communication 98 is detected, the CPU 52 functions as the communication block section 66 so as to block the communication between the communication section 58 and the communication network 16 via which the unauthorized communication 98 has been made.

Other than the planned communication of the above-described work command signals, completion-report signals, progress-confirmation signals, and progress-report signals, the CPU 52 can regularly carry out another planned communication for acquiring various kinds of information of the machines 20, 22, and 24.

The "various kinds of information" may include tool information of the machines 20, 22, and 24, load torques and temperatures of servo motors incorporated in the machines 20, 22, and 24, output signals of various sensors incorporated in the machines 20, 22, and 24, or the like.

Figure 4:
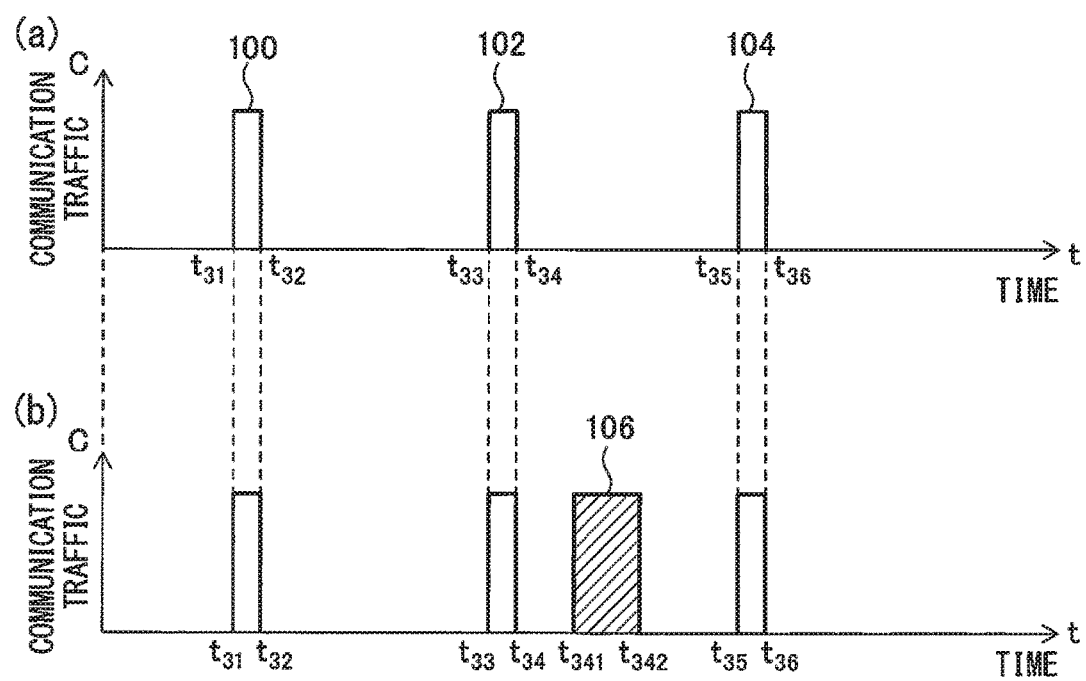
FIG. 4 is a timing diagram of the communication traffic between the cell control device and the manufacturing cell according to still another example, wherein section (a) shows a timing diagram of the planned communication traffic, and section (b) shows a timing diagram of the communication traffic when unauthorized communication is superimposed on a planned communication.

Such an example will be described below with reference to FIG. 4. Section (a) in FIG. 4 shows a timing diagram in which planned communication for acquiring information of the machine 20 is carried out.

The CPU 52 regularly carried out the planned communication of machine monitor signals 100, 102, and 104 for acquiring information of the machine 20 between the CPU 52 and the machine 20, over time periods from a time point $t_{31}$ to a time point $t_{32}$, from a time point $t_{33}$ to a time point $t_{34}$, and from a time point $t_{35}$ to a time point $t_{36}$.

Next, with reference to section (b) in FIG. 4, a function for detecting unauthorized communication while executing the planned communication shown in section (a) in FIG. 4 will be described. In the example shown in section (b) in FIG. 4, unauthorized communication 106 due to an unauthorized access to the communication section 58 via the communication network 16 is carried out in a time period from the time point $t_{34}$ to the time point $t_{35}$ in which no communication is planned.

The CPU 52 constantly monitors the actual communication traffic $C_a$ in the communication section 58, and compares the actual communication traffic $C_a$ in the communication section 58 with the planned communication traffic $C_p$ of the planned communication for each predetermined time period.

As an example, the CPU 52 calculates the actual communication traffic $C_a$ in the communication section 58 in a time period $T_D$ from a time point $t_p$ (i.e., time point $t_{31}, t_{33}$, or $t_{35}$) at the start of one planned communication $P_p$ (i.e., the communication of the signal 100, 102 or 104) to a time point $t_{p+1}$ at the start of next planned communication $P_{p+1}$ (i.e., $T_D=t_{p+1}-t_p$).

Specifically, the CPU 52 sends a command to the timer 60 at each of the time points $t_{31}, t_{33}$, and $t_{35}$ at the start of the planned communication of the signals 100, 102, and 104, so as to start to clock an elapsed time therefrom. Then, the CPU 52 calculates the actual communication traffic $C_a$ in a time period until a predetermined time $\tau_6$ is elapsed from each time point $t_{31}, t_{33}, t_{35}$.

In this regard, it is possible to predict the time period $T_D$ since the CPU 52 executes the planned communication shown in section (a) in FIG. 4 according to a predetermined program. The predetermined time $\tau_6$ is previously determined as a time coinciding with the predicted time period $T_D$ (i.e., $\tau_6=T_D$), and is stored in the system memory 54.

Further, it is also possible to predict planned communication traffic $C_p$ of the planned communication of the signals 100, 102, and 104 from e.g. a data format and program of the planned communication. The planned communication traffic $C_p$ is also pre-stored in the system memory 54.

The CPU 52 compares the actual communication traffic $C_a$ in a time period until the time $\tau_6$ is elapsed from the time point $t_{31}$, $t_{33}$, or $t_{35}$ with the planned communication traffic $C_p$ of the planned communication executed in this time period, and determines whether the actual communication traffic $C_a$ is more than the planned communication traffic $C_p$.

For example, in the example shown in section (b) in FIG. 4, the CPU 52 calculates the actual communication traffic $C_a$ in the time period until the time $\tau_6$ is elapsed from the time point $t_{33}$ (i.e., corresponding to the time period $t_{33}$-$t_{35}$). In this case, the actual communication traffic $C_a$ is a sum of the planned communication traffic $C_p$ of the signal 102 and the communication traffic of the unauthorized communication 106.

Accordingly, in this case, the CPU 52 determines that the actual communication traffic $C_a$ is more than the planned communication traffic $C_p$, and thus, can detect that the unauthorized communication 106 has been made in the time period $t_{33}$-$t_{35}$.

When the unauthorized communication 106 is detected, the CPU 52 functions as the communication block section 66 so as to block the communication between the communication section 58 and the communication network 16 via which the unauthorized communication 106 has been made.

Similarly, the CPU 52 carries out planned communication of machine monitor signals for acquiring information of the machines 22 and 24 between the CPU 52 and the machines 22 and 24, and can detect unauthorized communication during the execution of the planned communication, in the same manner as described above.

Next, still another example of unauthorized communication detection will be described with reference to FIG. 5. In this example, the CPU 52 carries out planned communication of a machine monitor signal 110a for acquiring information of the machine 20 between the CPU 52 and the machine 20, as shown in section (a) in FIG. 5.

Next, the CPU 52 carries out planned communication of a machine monitor signal 112a for acquiring information of the machine 22 between the CPU 52 and the machine 22. Next, the CPU 52 carries out planned communication of a machine monitor signal 114a for acquiring information of the machine 24 between the CPU 52 and the machine 24.

Subsequently, the CPU 52 carries out planned communication in the order of the machine monitor signal 110b for acquiring information of the machine 20, the machine monitor signal 112b for acquiring information of the machine 22, and the machine monitor signal 114b for acquiring information of the machine 24.

Thus, in this example, the CPU 52 carries out a series of the planned communication relating to the machine monitor signals in the order of the machines 20, 22, and 24.

Due to the structure of the communication network 16 or the communication system in use for the communication by the machines 20, 22, and 24, etc., there may be a difference in the communication speed between the cell control device 50 and the machines 20, 22, and 24.

Figure 5:
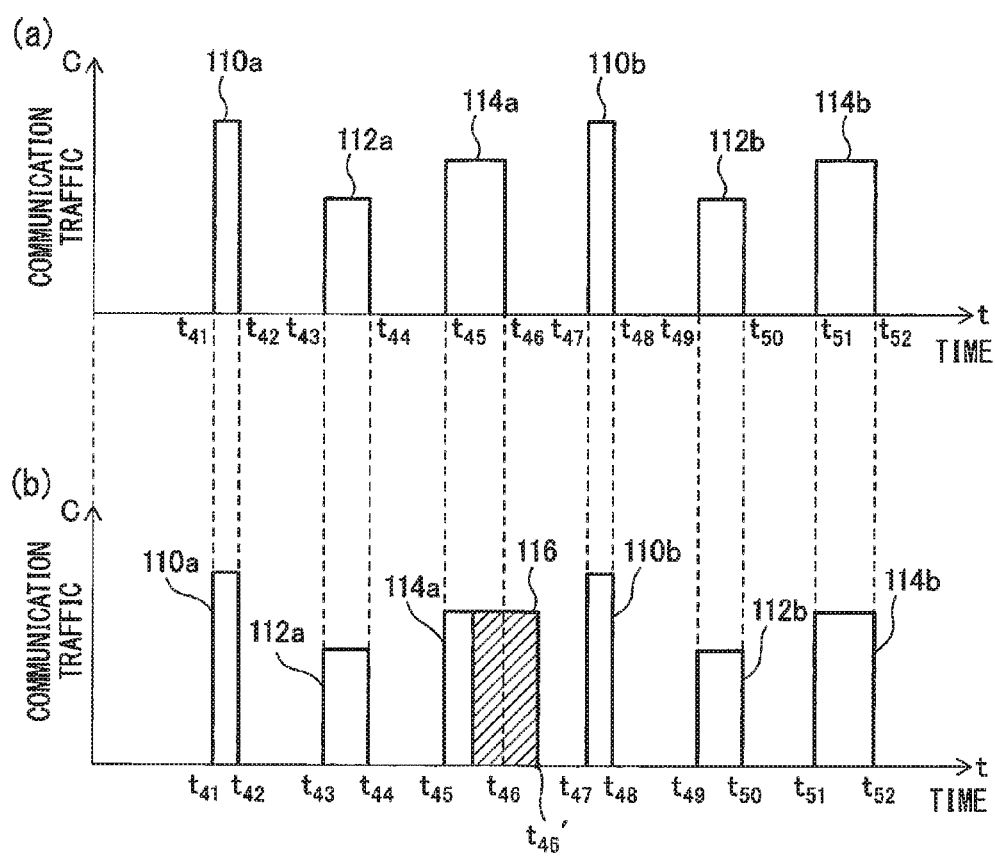
FIG. 5 is a timing diagram of the communication traffic between the cell control device and the manufacturing cell according to still another example, wherein section (a) shows a timing diagram of the planned communication traffic, and section (b) shows a timing diagram of the communication traffic when unauthorized communication is superimposed on a planned communication.

In such a case, if the signals are transmitted at respective maximum communication speeds, the communication traffic C of the machine monitor signals 110a and 110b, the communication traffic C of the machine monitor signals 112a and 112b, and the communication traffic C of the machine monitor signals 114a and 114b are different from each other, as shown in sections (a) and (b) in FIG. 5.

Hereinafter, with reference to section (b) in FIG. 5, a function for detecting unauthorized communication while executing the planned communication shown in section (a) in FIG. 5 will be described. In the example shown in section (b) in FIG. 5, unauthorized communication 116 due to an unauthorized access to the communication section 58 via the communication network 16 is carried out so as to be partially superimposed on the planned communication of the machine monitor signal 114a.

The CPU 52 compares the actual communication traffic $C_a$ with the planned communication traffic $C_p$ for each predetermined time period, similarly as the above-mentioned example of section (b) in FIG. 4.

As an example, the CPU 52 calculates the actual communication traffic $C_a$ in the communication section 58 for each time period $T_E$ from a time point $t_q$ (e.g., a time point $t_{41}$) at the start of one planned communication $P_q$ for acquiring information of the machine 20 (e.g., the planned communication of the signal 110a) to a time point $t_{q+1}$ (e.g., a time point $t_{47}$) at the start of next planned communication $P_{q+1}$ for acquiring information of the same machine 20 (e.g., the planned communication of the signal 110b).

Specifically, the CPU 52 sends a command to the timer 60 at each of the time points $t_{41}$ and $t_{47}$ at the start of the planned communication of the signals 110a and 110b, so as to start to clock an elapsed time therefrom. Then, the CPU 52 calculates the actual communication traffic $C_a$ in a time period until a predetermined time $\tau_7$ is elapsed from each of the time points $t_{41}$ and $t_{47}$.

In this regard, the CPU 52 executes the planned communication shown in section (a) in FIG. 5 according to a predetermined program. Accordingly, the above time period $T_E$ is predictable. The predetermined time $\tau_7$ is previously determined as a time coinciding with the predicted time period $T_E$ (i.e. $\tau_7=T_E$), and is stored in the system memory 54.

On the other hand, it is also possible to predict the planned communication traffic $C_p$ of the planned communication of the signals 110a, 112a, 114a, 110b, 112b, and 114b. The predicted planned communication traffic $C_p$ is also pre-stored in the system memory 54.

The CPU 52 compares the actual communication traffic $C_a$ in the time period until the time $\tau_7$ is elapsed from the time point $t_{41}$, $t_{47}$ (corresponding to the time period $t_{41}$-$t_{47}$) with the planned communication traffic $C_p$ of the planned communication in this time period, and determines whether the actual communication traffic $C_a$ is more than the planned communication traffic $C_p$.

For example, in the example shown in section (b) in FIG. 5, the actual communication traffic $C_a$ in the time period until the time $\tau_7$ is elapsed from the time point $t_{41}$ is a sum of the planned communication traffics $C_p$ of the signals 110a, 112a, and 114a and the communication traffic of the unauthorized communication 116.

Accordingly, the CPU 52 determines that the actual communication traffic $C_a$ in this time period is more than the planned communication traffic $C_p$, and thus, can detect that the unauthorized communication 116 has been made in the time period $t_{41}$-$t_{47}$.

When the unauthorized communication 116 is detected, the CPU 52 functions as the communication block section 66 so as to block the communication between the communication section 58 and the communication network 16 via which the unauthorized communication 116 has been made.

As stated above, in the above-mentioned various examples, the detection of the unauthorized communication superimposed on the planned communication between the manufacturing cell 12 and the cell control device 50 are described. Note that, the technical concept of these various examples can also be applicable to detection of unauthorized communication superimposed on planned communication between the production management device 14 and the cell control device 50.

As an example, the cell control device 50 determines whether any communication traffic is detected between the communication section 58 and the production management device 14 in a time period in which the planned communication shown in section (a) in FIG. 2 (i.e. the communication of the signals 70 and 84) is not to be carried out.

In the example shown in section (a) in FIG. 2, the time period in which the planned communication is not to be carried out between the communication section 58 and the production management device 14 is a time period from the time point $t_1$ to the time point $t_{12}$, which is predictable from the cycle times of the works carried out by the machines 20, 22, and 24, the amount of information of the signals (a total communication traffic) determined by e.g. data format, and the communication speeds of the communication networks 16 and 18, etc.

When the CPU 52 detects that any communication traffic via the communication network 18 occurs in the communication section 58 within the time period $t_1$-$t_{12}$ in which no communication is planned, the CPU 52 determines in real time that the actual communication traffic in the communication section 58 is more than the planned communication traffic. Thereby, it is possible to detect the unauthorized communication via the communication network 18.

When the unauthorized communication via the communication network 18 is detected, the CPU 52 blocks the communication between the communication section 58 and the communication network 18, whereas it does not block the communication between the communication section 58 and the communication network 16 in which no unauthorized communication is detected.

Note that, in the above-described examples, the CPU 52 may regularly create an authentication key for use in communication between the communication section 58 and the production management device 14 and communication between the communication section 58 and the manufacturing cell 12. Due to this, it is possible to more effectively prevent the unauthorized communication.

The network system 10 may further include a second manufacturing cell having a plurality of machines, in addition to the manufacturing cell 12 shown in FIG. 1, wherein the second manufacturing cell and the communication section 58 may be communicably connected to each other via a third network.

In this case, when the unauthorized communication via the network 16 is detected as shown in section (c) in FIG. 2, the CPU 52 blocks the communication between the communication section 58 and the network 16, whereas it does not block the communication between the communication section 58 and the third communication network. Due to this, it is possible to make the second manufacturing cell to continuously carry out the work thereof.

Further, in the embodiment shown in FIG. 1, the manufacturing cell 12 includes a total of three machines 20, 22, and 24. However, the manufacturing cell 12 may include one, two, or four or more machines.

Further, in the embodiment shown in FIG. 1, the communication section 58 may include a first communication section configured to communicate with the production management device 14 and a second communication section configured to communicate with the manufacturing cell 12. In this case, when the unauthorized communication is detected in the second communication section, the CPU 52 blocks the communication in the second communication section, whereas it maintains the communication in the first communication section in which no unauthorized communication is detected.

Further, in the above-described embodiment, the communication network 16 is comprised of an intranet or LAN, and the communication network 18 is comprised of the Internet or the like.

However, the communication network 16 or 18 may be comprised of a single communication cable that directly connects the communication section 58 to the manufacturing cell 12, or connects the communication section 58 to the production management device 14.

Further, when the unauthorized communication is detected in the communication section 58, the CPU 52 may generate an alarm signal indicative of it in the form of sound or image, so as to output the warning signal to a user. In this case, the cell control device 50 may further include a speaker or display device, through which the cell control device 50 may output the warning signal.

Further, the method of detecting the unauthorized communication described with reference to section (b) in FIG. 4 or 5 can also be applicable to the detection of the unauthorized communication 86, 88 or 98 in section (c) or (d) in FIG. 2 or section (b) in FIG. 3.

Further, the method of detecting the unauthorized communication described with reference to section (c) or (d) in FIG. 2 or section (b) in FIG. 3 can also be applicable to the detection of the unauthorized communication 106 or 116 in section (b) in FIG. 4 or 5.

While the invention has been described by some embodiments thereof, the invention according to the claims is not limited thereto. Embodiments as combinations of the features described in the embodiments of the invention can also be included in the technical scope of the invention, but not all of the combinations of the features are essential to solutions of the invention. Furthermore, it is also obvious to those skilled in the art that various changes or alterations can be added to the above-described embodiments.

It is to be noted that in the apparatuses, systems, programs, and methods shown in the claims, the specification, and the drawings, the respective processes such as operations, procedures, steps, processes, and stages can be executed in any order as long as the order is not particularly specified by "before", "prior to", or the like and as long as an output of a previous process is not used in a later process. Even if any operational flow in the claims, the specification, and the drawings is described by using "first", "next", "then", "subsequently" and the like for convenience, it does not necessarily mean that the operational flow should be performed in that order.

The invention claimed is:

1. A cell control device configured to control a manufacturing cell including a plurality of machines in accordance with a command from a production management device, the cell control device comprising:

a communication section configured to communicate with the production management device or the plurality of machines; and a processor configured to
- control the communication section to carry out the communication,
- predict a time period from a first time point when a first planned communication is completed to a second time point when a second planned communication to be executed next following the first planned communication is started,
- monitor, in real time, actual communication traffic in the communication section, during the predicted time period in which no communication is planned, and
- in response to detecting actual communication traffic in the communication section during the predicted time period, determine that unauthorized communication occurred.

2. The cell control device according to claim 1, wherein the processor is further configured to block the communication by the communication section in response to a determination that unauthorized communication occurred.

* * * * *